(12) United States Patent
Karp et al.

(10) Patent No.: US 8,675,851 B1
(45) Date of Patent: Mar. 18, 2014

(54) SYSTEM AND METHOD FOR CALL ROUTING MANAGEMENT IN A TELECOMMUNICATION NETWORK

(75) Inventors: Matthew Abram Karp, Tulsa, OK (US); Brian Bennefeld, Broken Arrow, OK (US); Michael Jared Officer, Broken Arrow, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/618,750

(22) Filed: Sep. 14, 2012

(51) Int. Cl.
*H04M 3/42* (2006.01)

(52) U.S. Cl.
USPC .................................. 379/201.01; 379/230

(58) Field of Classification Search
USPC ............................................ 379/211.01, 230
See application file for complete search history.

(56) References Cited

U.S. PATENT DOCUMENTS 7,394,894 B2 * 7/2008 Christie et al. ............... 379/188

OTHER PUBLICATIONS

International Search Report, dated Oct. 9, 2013, Int'l Appl. No. PCT/US13/059790, Int'l Filing Date Sep. 13, 2013.
Written Opinion of the International Searching Authority, dated Oct. 9, 2013, Int'l Appl. No. PCT/US13/059790, Int'l Filing Date Sep. 13, 2013.

* cited by examiner

*Primary Examiner* — Quynh Nguyen

(57) ABSTRACT

Aspects of the present disclosure involve systems, methods, computer program products and the like for managing calls in a telecommunication network. In one example, the systems and methods involve passing information into a standard signaling flow in order to obtain a unique routing for customers sharing a single interface.

20 Claims, 6 Drawing Sheets

SYSTEM AND METHOD FOR CALL ROUTING MANAGEMENT IN A TELECOMMUNICATION NETWORK

TECHNICAL FIELD

Aspects of the present disclosure relate generally to telecommunications networks, and in particular, to a method and system for managing calls between various components within a telecommunications network.

BACKGROUND

A telecommunication network is a collection of interconnected sub-networks, such as for example, circuit switched, Internet Protocol (IP) and backbone networks that enable communication between various network endpoints. The circuit switched network includes a public switched telephone network (PSTN) that includes telephone lines and fiber optic cables that carry voice signals, such as telephone conversations. The IP network allows for the exchange of both data and audio signals and may include, for example, an Internet Service Provider (ISP) network. The backbone network serves as an interface between other network types; so, for example, a call originating in a PSTN network may traverse the backbone network and connect to an IP enabled phone connected to the ISP network. The backbone network may include one or more gateways and one or more softswitches. The gateway site originates and terminates calls between calling parties and can include network access devices such as, for example, a media gateway. The softswitch provides the call processing required for establishing new calls.

Typically, call handling within the telecommunication network requires setting up a call over the plurality of the sub-networks. Depending on the call origination and termination points, the call will require different call processing as the voice signal traverses the different networks. For example, signals originating in the circuit switched network, such as from a caller making a call using a conventional Plain Old Telephone Service (POTS) phone, and terminating on either a switched or IP network, such as at a Voice Over Internet Protocol (VoIP) phone, require different processing than signals originating on the IP network and terminating on the IP or circuit switched network. More specifically, different signaling protocols need to be used to establish, modify and terminate calls depending on their origination and termination points.

In an attempt to simplify the telecommunication network while at the same time providing greater functionality transmitting and managing information between various network types there are ongoing efforts to move from the circuit switched networks to softswitch managed telecommunication networks. One challenge in this migration has been customized or unique call handling for unique customers. More specifically, in the legacy circuit switched networks, call differentiation is based on the information included in individual switches within the PSTN, with all of the customer specific information stored at the switch. There is not an equivalent device in softswitch managed network.

Thus, in order to facilitate the transition from the legacy circuit switched based networks to the softswitch based telecommunication networks there is a need for a system that minimizes call handling infrastructure. In particular, there is a need for a system that is capable of handling a call flow conventionally handled by circuit switched based networks without the need for provisioning a multitude of network interfaces in order to provide unique call handling to customers. It is with respect to these and other considerations that embodiments of the present disclosure have been made.

SUMMARY

An embodiment of a system for managing calls in a telecommunication network includes a call management device, such as a softswitch, operable to receive a signaling message associated with an incoming call that includes a plurality of signaling parameters. The call management device is further operable to determine from at least one of the signaling parameters a unique customer handing parameter associated with at least one call handling group predefined at the call management device. The at least one call signaling parameter includes call handling information unique to the incoming call, such as for example, information regarding a carrier to be used for handling the incoming call and the call handling group specifies call handling requirements for the incoming call. The call management device may further be operable to generate a redirect query, such as to a redirect server that includes the unique customer handling parameter.

The system may thus further include a redirect server operable to receive the redirect query. The redirect server includes a plurality of differentiated routing partitions capable of providing call routing information corresponding to customer defined call handling requirements specified in the at least one predefined call handling group, with the unique customer handling parameter associated with at least one of the plurality of differentiated routing partitions. The redirect server is operable to return to the call management device unique customer call routing information corresponding to, for example, the call handling requirements specified by a customer and associated with at least one termination gateway based on information within the differentiated routing partitions.

An embodiment of a method for managing calls in a telecommunication network includes receiving a signaling message that includes a plurality of signaling parameters at a call management device on, for example, a shared access resource. An embodiment of the method my further include screening the incoming signaling message to determine a unique customer handling parameter associated with at least one call handling group predefined at the call management device based on at least one of the signaling parameters included in the signaling message. The signaling parameters include call handling information unique to a customer.

An embodiment of the method may further include generating a query using the unique customer handling parameter and querying at least one differentiated routing partition on a redirect server associated with the unique customer handling parameter. The method may also include returning unique customer call routing information to the call management device from the differentiated routing partitions in response to the query based on the unique customer handling parameter.

The method described herein may be carried out by one or more processors executing processor-executable instructions included on a processor-readable medium or media. For example the one or more processors may execute in a computing device, wherein computer storage media (e.g. memory) is communicably coupled to the one or more processors via a communication bus.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other features, details, utilities, and advantages of the present disclosure will be apparent from the following more particular written description of various embodiment of the disclosure as further illustrated in the accompanying drawings and defined in the appended claims.

DETAILED DESCRIPTION

Figure 1:
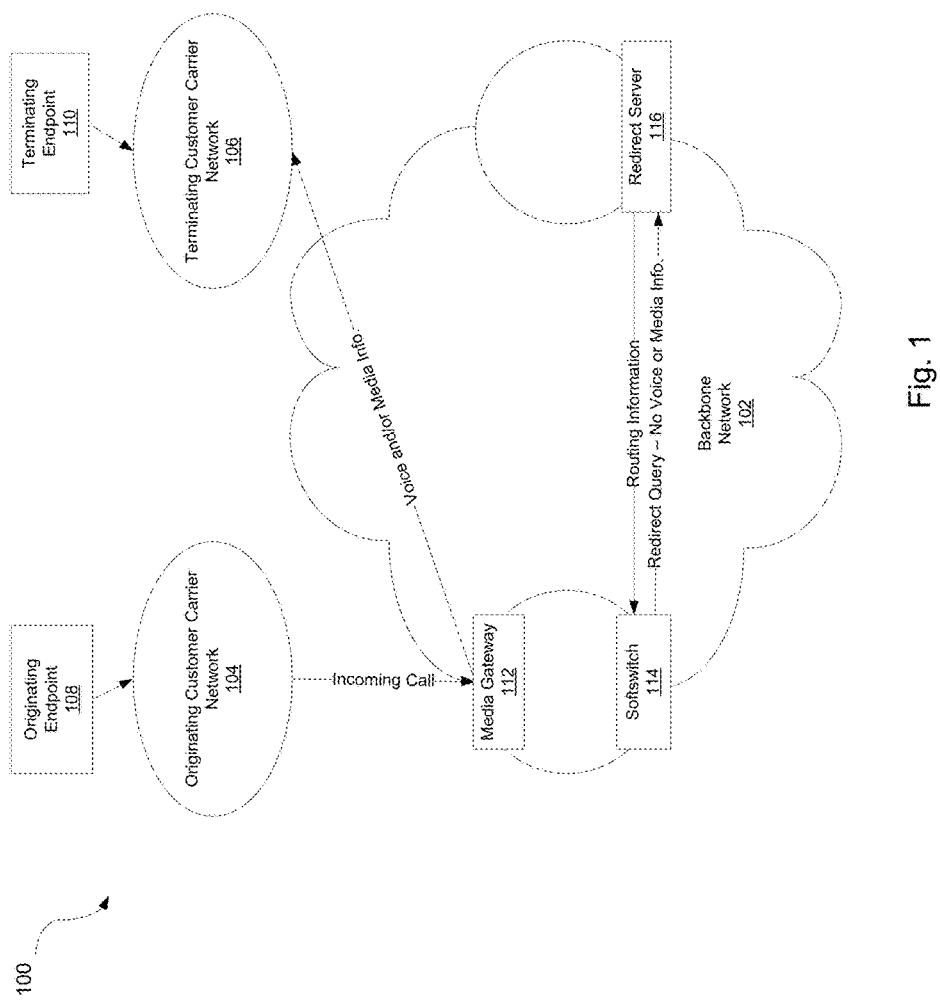
FIG. 1 is a schematic diagram illustrating an exemplary operating environment in accordance with one embodiment.

Aspects of the present disclosure involve apparatus, systems, methods, computer program products and the like for managing calls in a telecommunication network. In one example, the systems and methods involve passing information into a standard signaling flow in order to obtain unique routing instructions for customers sharing a single interface such as a shared access trunk group. More particularly, the system provides for unique routing of calls arriving on a shared access trunk group based on pre-established customer groups. The system screens incoming call signaling messages in order to extract call handling information unique to each incoming call so that customized call handling information and/or differentiated routing instructions can be obtained for each customer. In particular, the system may determine a unique customer handling parameter that is associated with at least one call handling group defined at a call management device such as a softswitch. The determination is based on the signaling parameters included in the incoming signaling message.

The system determines the final call routing by including the identified unique customer handling parameter into standard type signaling, following the screening process. In particular, the unique customer handling parameter attribute is included in a trigger, such as for example an advanced intelligent network (AIN) trigger or a similar call model, to handle custom calls or otherwise customer-specific basis. More specifically, when a session origination protocol (SIP) redirect query is sent to a redirect server, such as for example a core routing engine (CRE), the unique customer handling parameter (as defined or otherwise included in the trigger) is used by the redirect server to determine call routing. In response to the query, the redirect server accesses a differentiated routing partition corresponding to the unique customer handling parameter. Based on the information included in the partition, the redirect server provides a message with one or more of IP address and destination trunk group (DTG) combinations for terminating calls.

The use of a unique customer handling parameter in the SIP redirect query provides several advantages. First, none of the specific customer information is transmitted to a redirect server thereby keeping the customer information confidential. Instead, customer information is retained at the call management device while a query with the unique customer handling parameter is sent to a redirect server for call routing determination. Second, since only a query request is sent to the redirect server without the actual voice and/or media information, a more efficient system is realized, as the number of nodes through which the actual voice and/or media information passes is reduced as compared to the number of nodes that it traverses in a conventional system. Finally, calls can be handled according to specific customer requirements. Stated differently, customized call handling and/or differentiated routing can be achieved using customer specific call handling information included with each incoming call.

For a more detailed discussion of an exemplary operating environment in which a call routing management system that utilizes a unique customer handling parameter or attribute in the SIP redirect query can be used, reference is made to FIG. 1. The environment 100 includes an originating customer carrier network, such as originating customer carrier network 104, a terminating customer carrier network, such as terminating customer carrier network 106 and a backbone network 102 that facilitates call routing between the two networks as well as other functions. In the example operating environment shown, the originating customer carrier network 104 further includes an originating endpoint 108 associated with the originating party, for example, a calling party, and the terminating customer carrier network 106 includes a terminating endpoint 110 associated with a destination point, for example, a called party. The originating and terminating customer carrier networks may be either circuit switched or IP networks. The switched network may include a PSTN network, a local exchange carrier network or a cellular network to name just a few. The IP network may include an Internet Service Provider (ISP) network, an autonomous system (AS) network or any other customer carrier network. Depending on the type of network to which they are connected, the endpoints 108 and 110 could include, for example, conventional telephone, cellular telephone, a facsimile machine, VoIP phones, computers or other devices, that can conduct a call.

The backbone network 102 may include a media gateway 112, a softswitch 114 and a redirect server 116 that determines the optimal call routing between different types of networks. In the operating environment shown in FIG. 1, the media gateway converts the incoming calls from the format used in one network to the format required in another network. For example, the media gateway can terminate the time division multiplexing (TDM) trunks from the PSTN network, packetize the audio signals, and then deliver the packets to the IP network. The softwswitch, provides call processing as well as manages the resources of the media gateway or gateways that it controls. In particular, the softswitch is responsible for setting up a call and controlling the TDM endpoint in the media gateway. According to one embodiment, the softswitch includes a number of internal elements that make call handling more efficient as compared to the conventional softswitch and provide call differentiation. For example, the softswitch may include two internal elements, such as customer identifying element and a call handling element. The customer identifying element determines customers associated with the incoming calls, and the call handling element provides information on how to handle calls for the identified customers.

As indicated in FIG. 1, in one possible embodiment, the softswitch relies on the redirect server 116 to provide routing information that includes routes available between various customer carrier networks among other things, to set up a call. In particular, in response to a query received from the softswitch, the redirect server determines the most efficient and cost effective routes for each call based on customer requirements. More specifically, one of a plurality of differentiated routing partitions that includes routing information corresponding to customer specific requirements is searched on the redirect server in order to determine call routing information. For example, a least-cost routing (LCR), partition which provides routes of outbound communication traffic based on cost may be accessed when inexpensive routes for terminating a call are desired. On the other hand, partitions that provide higher quality routes are searched when, for example, a higher level of service is desired by a customer.

According to one embodiment, a differentiated routing for calls arriving on the same shared access resource may be achieved by passing a unique customer handling parameter provided by the softswitch into a trigger. More specifically, by assigning unique customer handling parameter to predetermined customer groups, each customer group may be provided with customized routing. Thus, for example, calls for customers requiring or otherwise contracted for a high quality service as determined by the softswitch will be routed through high quality routes. On the other hand, other routes will be provided by the redirect server for customer groups determined to require a different level of service. In other words, when calls arrive at the softswitch on a shared access trunk group, the softswitch screens the incoming calls and assigns each call to one of a plurality of predefined customer groups based on the information included in the call. More specifically, information indicative of customer requirements is determined from the incoming signaling messages and based on that information each call is assigned to a predefined customer group. With each customer group associated with a specific differentiated routing partition on a redirect server, unique customer routing can be obtained from the redirect server for each customer group.

Figure 2:
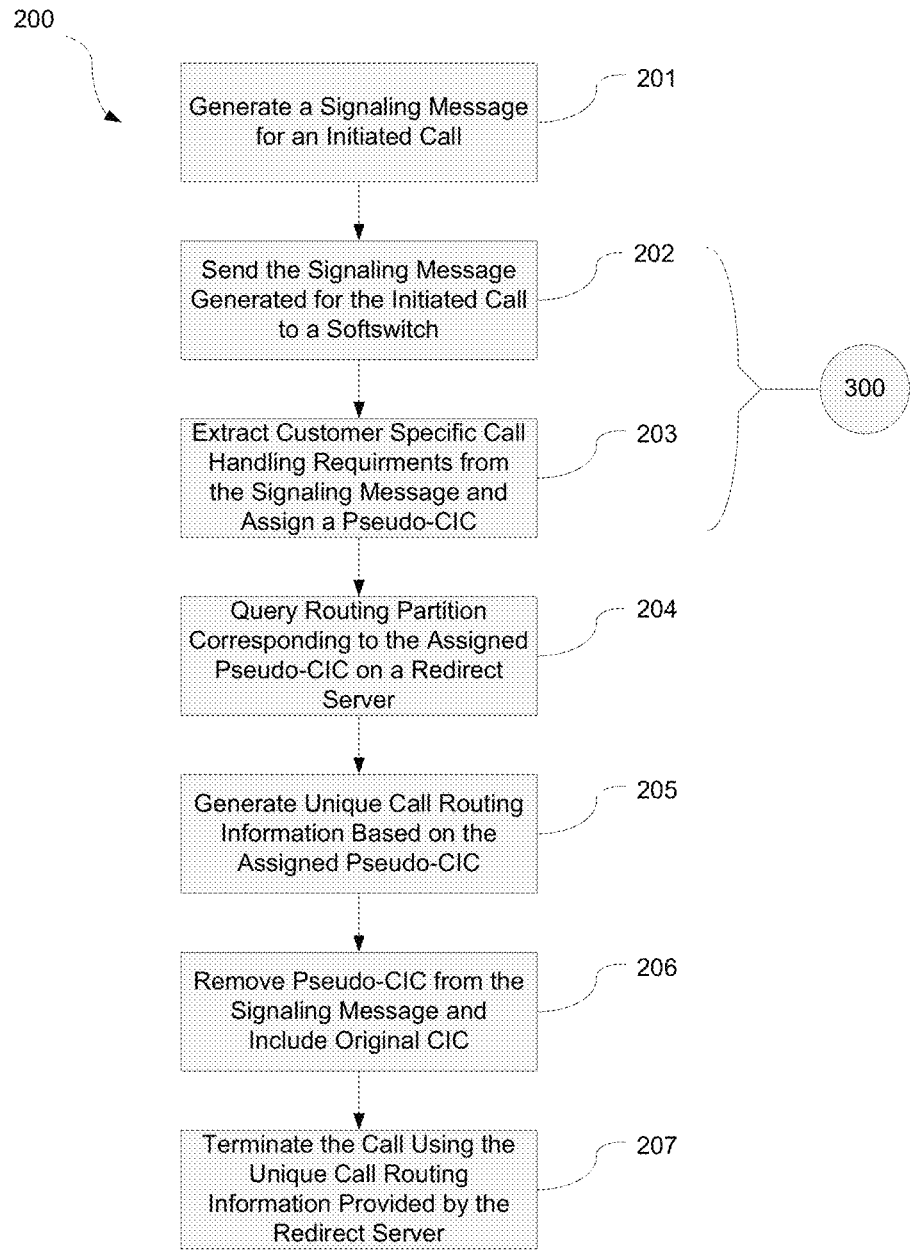
FIG. 2 is an exemplary flow diagram depicting a call flow utilizing a call routing management according to one embodiment.

Now discussion will turn to a method of using the disclosed system to provide differentiated routing in a telecommunication network. In particular, reference will be made to FIGS. 2 through 4 to explain the differentiated routing process. According to one embodiment, as shown in FIG. 2, the following steps might be executed in order to complete a call between, for example, the originating endpoint 108 and the terminating endpoint 110. To begin, in order to ensure that voice signals are transferred correctly and efficiently between network endpoints, a voice channel or a call is first setup for the voice transmission using signaling messages. Within a circuit-switched network this is typically accomplished using a Signaling System #7 (SS7) signaling protocol and in an IP network SIP signaling is typically used for this purpose. Thus, when a call is initiated, information relevant to the originating call, such as that indicative of user preferences is collected and assembled into a signaling message (step 201) which is then exchanged between various network points in order to set up a call. The signaling message, may, for example, include information related to the carrier that is to be used for carrying or processing the call, as well as the information corresponding to both the origination and destination points, such as those related to the called and/or calling party number. The signaling message generated in the PSTN network, for example, may include a Carrier Identification Code (CIC) that specifies the carrier to be used to process the incoming call.

After the signaling message is generated at the originating customer carrier network, it is subsequently sent to a softswitch (step 202) for further processing. While at the softswitch, a customer specific call handling information is extracted from the signaling message (step 203) in order to determine unique customer call routing. In particular, the signaling message arriving at the softswitch is screened to identify a call originating customer and the customer specified call handling requirements. More specifically, as discussed in more detail below with reference to FIG. 3, the process of screening may involve assigning each call to a specific customer group, with all calls belonging to a given group being handled in a particular manner. In other words, both the identified customer and the customer specified call handling determined at the softswitch may be used to provide unique call routing to each customer.

According to one embodiment, the entire call screening process can be performed at the softswitch with only the query being executed on the redirect server. By limiting the call screening process to the softswitch a more efficient call processing as compared to the conventional methods can be achieved as the step of performing additional screening that is typically performed at the redirect server is eliminated.

Figure 3:
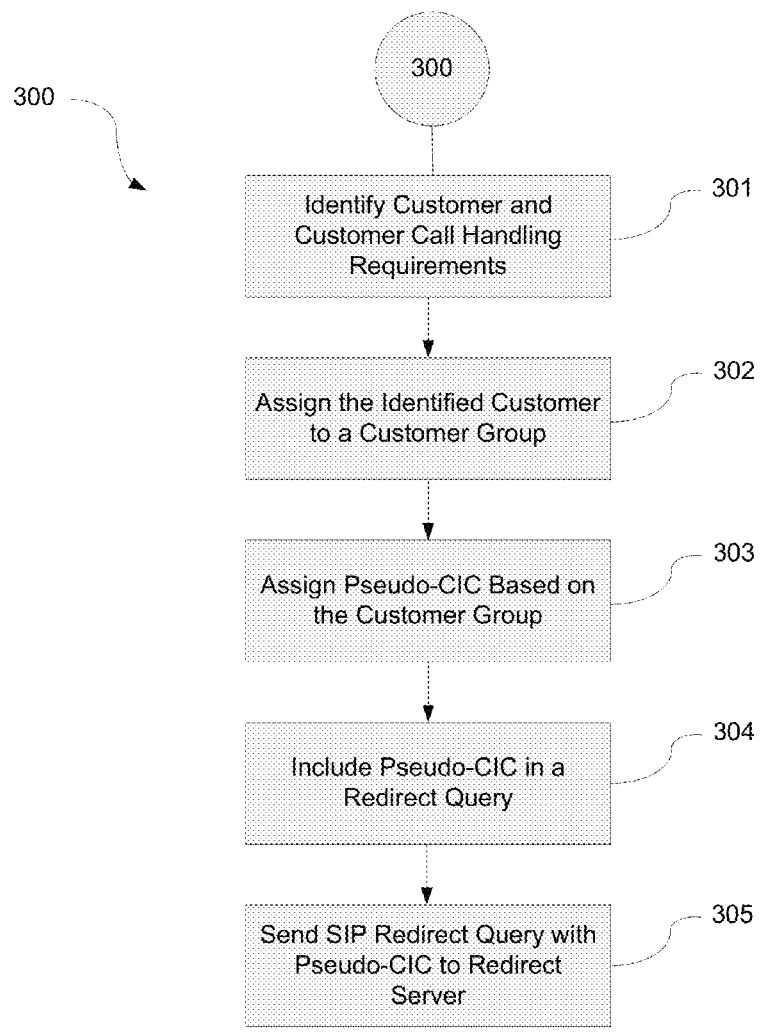
FIG. 3 is an exemplary flow diagram depicting a screening process performed at the softswitch according to one embodiment.

As shown in FIG. 3, the call screening process 300 begins with identifying a customer, along with the corresponding customer call handling requirements (step 301), and assigning the identified customer based on the customer call handling requirements to a customer group (step 302). According to one embodiment, the call screening process is performed below a trunk group level. More specifically, in a conventional system call screening is performed at the trunk group level using an Originating Trunk Group (OTG) label with all calls coming on the same trunk being treated similarly. In other words, because all calls coming on the same trunk are processed the same way, customer specific treatment in not possible. Call screening according to the present disclosure, on the other hand, is performed at the level below the trunk group level facilitating customer specific or unique treatment of calls. In other words, because all calls arrive at a softswitch on a shared access resource, such as Feature Group D (FG-D) trunk, call differentiation or handling in the disclosed system is performed using information or signaling parameters within the signaling message other than the OTG label. For example, Carrier Identification Code (CIC), along with call origination information, such as for example, charge number, calling number and originating line, might be used in determining customer specific call handling.

A unique customer handling parameter (referred to herein as a "pseudo-CIC") is assigned to the previously determined customer group (step 303). More specifically, the assigned pseudo-CIC may specify a partition to be searched on the redirect server in order to obtain unique call routing information for a given customer. In other words, because call routing in the redirect server is determined by searching predefined differentiated routing partitions, with each partition including call termination and/or routing information corresponding to predefined call handling requirements, the pseudo-CIC specifies the partition to be searched in order to obtain customized routing for each identified customer. The pseudo-CIC according to one embodiment may include formatting that differs from that of a conventional ISUP CIC and does not need to be carrier specific. In particular, the pseudo-CIC may vary based on the need and the information that it is to convey. For example, the pseudo-CIC may be four or more characters long. The pseudo CIC of up to six characters long can be used according to one embodiment. The pseudo-CIC may also be, for example, alphanumeric, case sensitive, and may include special characters and/or leading zeros that would be significant. The pseudo-CIC may also include information related to, for example, both the call origination and termination endpoints.

The above disclosed pseudo-CIC may be used in a SIP redirect query (step 304) in order to determine call routing. In particular, the SIP redirect query might be modified to include the pseudo-CIC as defined or included in the trigger. According to one embodiment, one of the parameters within the SIP redirect query, such as for example, the CIC parameter, may be temporarily removed or set aside and replaced with the previously determined pseudo-CIC. Once the SIP query is modified to include the pseudo-CIC, it may be sent to the redirect server (step 305) for routing determination.

Returning now to FIG. 2, after the SIP redirect query with the pseudo-CIC is sent to the redirect server, the redirect server determines routing information by searching a partition on the redirect server corresponding to the previously determined pseudo-CIC (204). According to one embodiment, routing partitions corresponding to the defined pseudo-CIC parameters are provisioned on the redirect server based on a predefined set of call handling requirements prior to the execution of a query with each partition including routes to multiple destinations. Thus, when a query is executed, the pseudo-CIC may be used to determine call routes by searching only the routing partition corresponding to the identified pseudo-CIC.

Figure 4A:
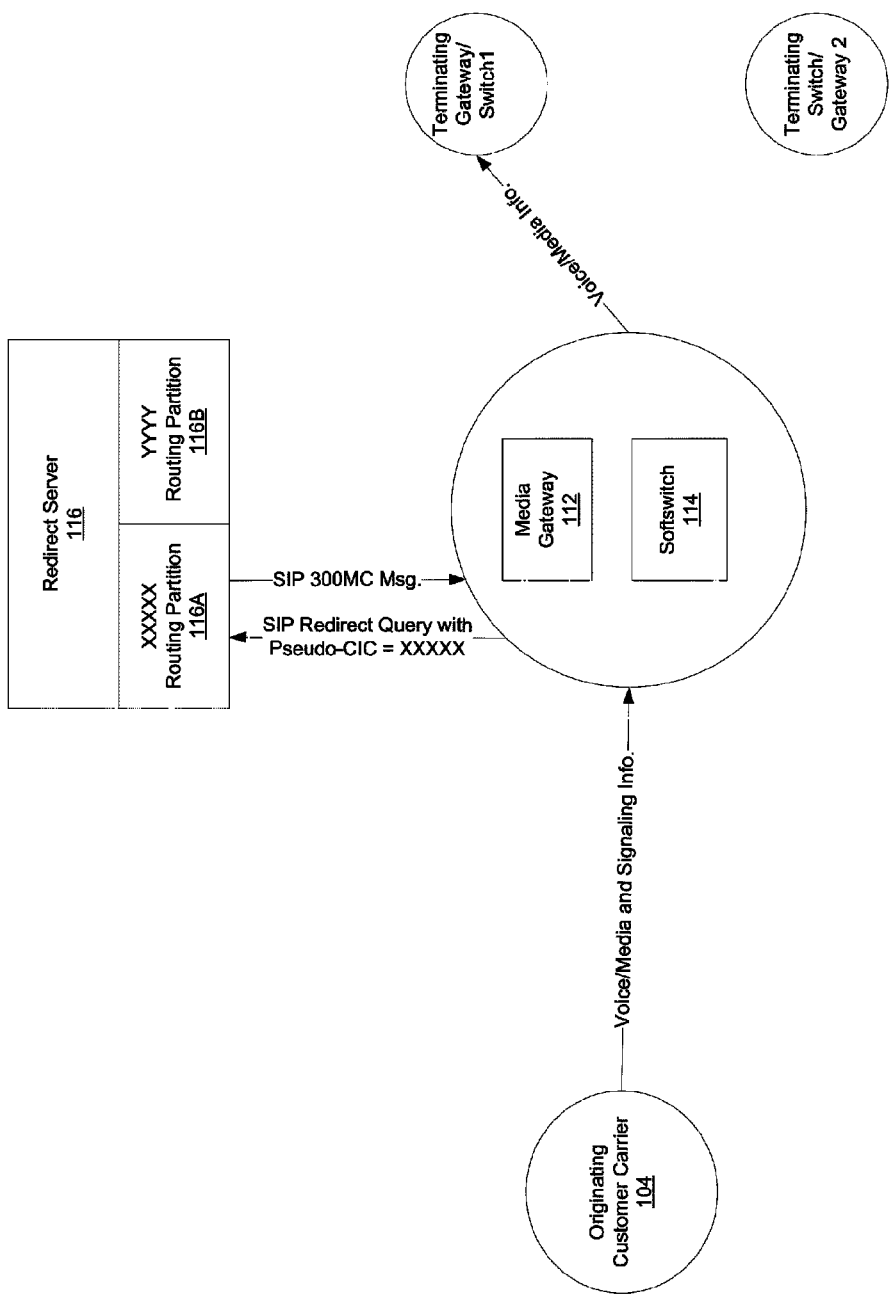
FIG. 4A is a schematic diagram illustrating call routing determination by utilizing a unique customer handling parameter to access one of the routing partitions.
Figure 4B:
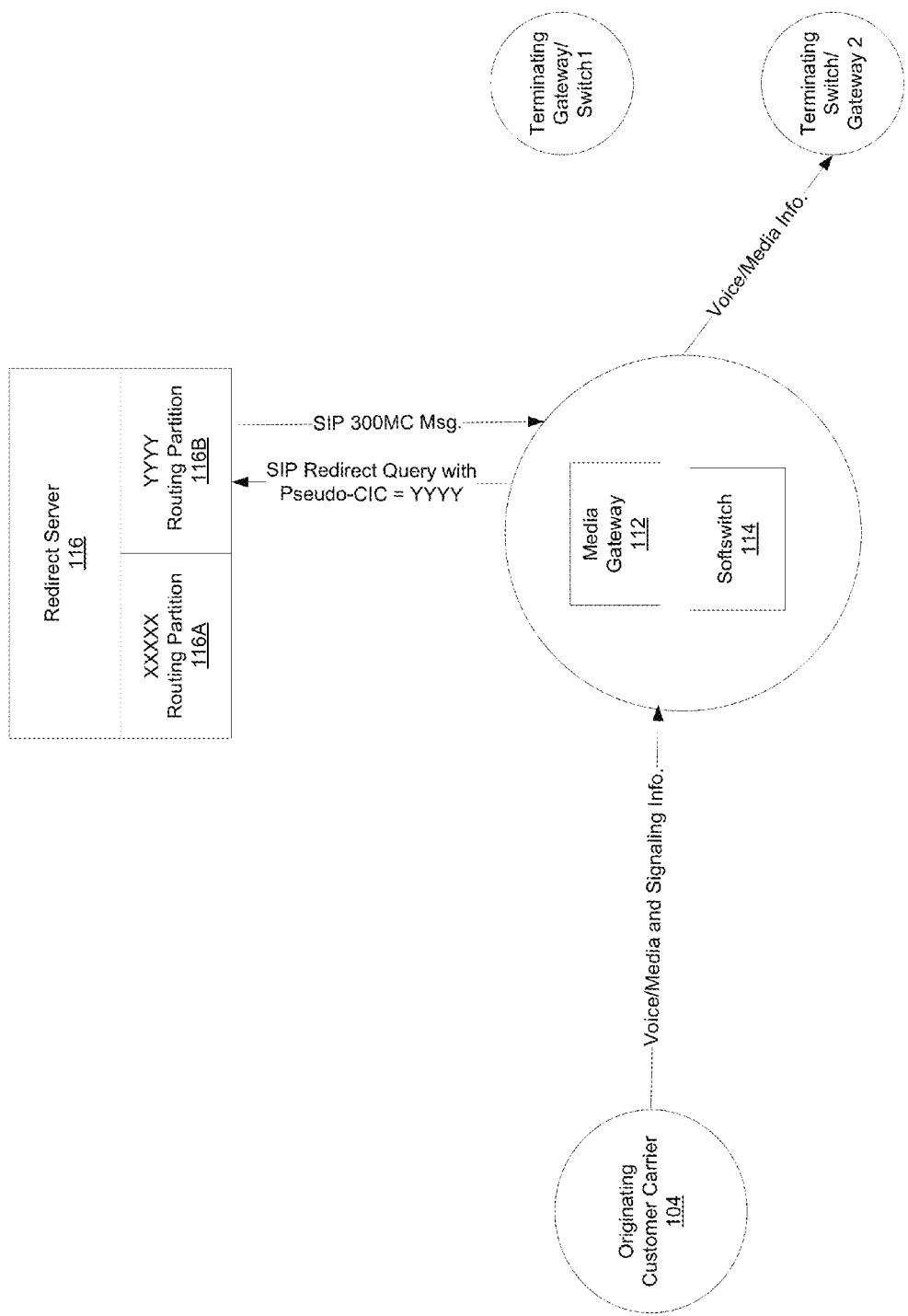
FIG. 4B is a schematic diagram illustrating call routing determination by utilizing a unique customer handling parameter to access another one of the routing partitions.

For example, as shown in FIG. 4A, the redirect server 116 may include one or more software implemented routing partitions, such as partitions XXXXX 116A and YYYY 116B. According to one embodiment, the routing partitions can be in a form of tables or databases stored at the redirect server. Based on the pseudo-CIC information included in the SIP redirect query, one of the partitions on the redirect server is accessed in order to determine routing information. More specifically, with the pseudo-CIC specified as XXXXX, for example, only the XXXXX routing partition in the redirect server would be accessed for routing determination. Similarly, as shown in FIG. 4B, with the pseudo-CIC specified as YYYY, for example, only the YYYY routing partition of the redirect server is accessed for routing determination. It should be understood however, that although redirect server is shown with only two partitions in FIGS. 4A and 4B, a plurality of partitions may be included and accessed on the redirect server.

The result of the SIP query performed on the redirect server is a unique call routing information for a given call. In particular, once the SIP redirect query is executed by the redirect server, a SIP message, such as a 300MC message, that includes a plurality of IP addresses and/or destination trunk groups (DTG) is generated by the redirect server and returned to the softswitch (step 205). In some instances, the 300MC message may include, for example, up to ten possible routes with unique IP address and DTG combinations that are determined based on the rates or connection/carrier quality. The route information determined by the redirect server is subsequently used by the softswitch to finish processing or routing of the actual voice and/or media information (step 207) by relaying voice and/or media information between the originating endpoint and the terminating endpoint along one of the determined routes. According to one embodiment, the pseudo-CIC included in the trigger can be first discarded and replaced with the original ISUP CIC, if it was included in the original signaling message, or if the terminating trunk group configuration allows for it (step 206) and the voice and/or media information can be then sent between two endpoints along the determined route. In other words, once the query results are returned to the softswitch, the original ISUP CIC can be used for any further call processing and would be outpulsed in an egress message, such as the egress Initial Address Message (IAM), SIP ISUP Multipurpose Internet Mail Extensions (MIME), or SIP header as "cic=" parameter.

According to yet another embodiment of the current disclosure, when voice and/or data information that needs to be transferred involves call origination point located in an IP network, the original signaling message generated using a SIP-T protocol may not include any CIC information. In such case, even though a pseudo-CIC that corresponds to a predetermined customer group is included in the trigger, the need for executing the steps of replacing the original CIC with the pseudo-CIC in the redirect query, as well as the step of including the original CIC back in the original signaling message, once the query is executed is eliminated. In other words, a differentiated routing is achieved by including the pseudo-CIC in a field normally reserved for the CIC information in the SIP redirect query without executing any other steps.

Included above are several examples and embodiments of a system and method for call routing management in a telecommunication network. In general, the call routing management involves determining a unique customer handling parameter from at least one of the signaling parameters included in a signaling message and assigning the unique customer handling parameter to one of the predetermined customer groups. Furthermore, the disclosed systems and methods for call routing management provide for accessing appropriate differentiated routing partitions on the redirect server using the unique customer handling parameter to obtain a differentiated call routing.

Figure 5:
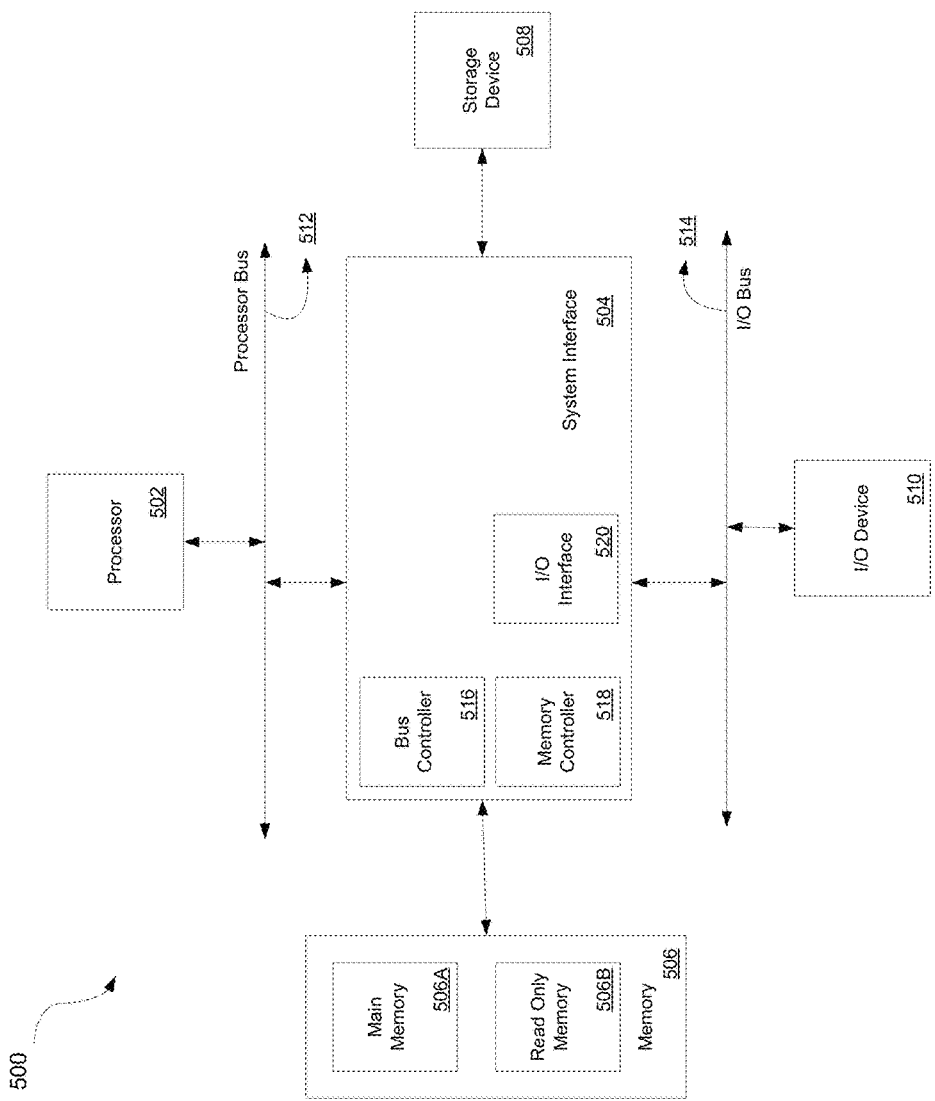
FIG. 5 is a block diagram illustrating an example of a computing system which may be used in implementing embodiments of the present disclosure.

FIG. 5 is a block diagram illustrating an example of a computing device or computer system 500 which may be used to implement the embodiments of a call routing management disclosed above. As discussed herein embodiments of the present disclosure include various steps or operations which maybe performed by hardware components, software components or, in alternative embodiment, hardware components may be used in combination with the software instructions. According to the present example, the computing device or system 500 includes at least one processor 502, a system interface 504, a memory 506, a storage device 508 and at least one I/O device 510. The system 500 further includes a processor bus 512 and an input/output (I/O) bus 514.

Processor 502 may include one or more internal levels of cache (not shown) and can be any known processor. Processor bus 512, also known as the host bus or the front side bus, may be used to couple the processor 502 with the system interface 504. System interface 504 may be connected to the processor bus 512 to interface various components of the system with the processor 502. System interface 504 may, for example, include a bus controller 516 or bus interface unit to direct interaction with the processor bus 512 and a memory controller 518 for interfacing the memory 506 with the processor bus 512. System interface 504 may also include an I/O interface 520 to interface one or more I/O devices 510 with the processor 502.

Memory 506 typically includes one or more memory cards and control circuit (not shown). Memory 506 may include a main memory 506A and a read only memory (ROM) 506B. The main memory 506A can be Random Access Memory (RAM) or any other dynamic storage device(s) for storing information and instructions to be executed by the processor 502. Main memory 506A may be used for storing temporary variables or other intermediate information during execution of instructions by the processor 502. The read only memory 506B can be any static storage device(s) such as Programmable Read Only Memory (PROM) chip for storing static information and instructions for the processor.

According to one embodiment, the above methods may be performed by computer system 500 in response to processor 502 executing one or more sequences of one or more instructions contained in the main memory 506A. These instructions may be read into main memory 506A from another machine-readable medium capable of storing or transmitting information in a form (e.g., software, processing application) readable by a machine (e.g., a computer). Execution of the sequences of instructions contained in main memory 506A may cause processor 502 to perform the process steps described herein.

A machine-readable media may take the form of, but is not limited to, non-volatile media and volatile media. Non-volatile media may include a mass storage device 508 and volatile media may include dynamic storage devices. Common forms of machine-readable medium may include, but is not limited to, magnetic storage medium (e.g. floppy diskette); optical storage medium (e.g. CD-ROM), magneto-optical storage medium; read only memory (ROM); random access memory (RAM); erasable programmable memory (e.g., EPROM and EEPROM); flash memory; or other types of medium suitable for storing computer instructions.

Embodiments of the present disclosure include various steps, which are described in this specification. As discussed above, the steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various embodiments, it will be understood that these embodiments are illustrative and that the scope of the disclosure is not limited to them. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternative, modifications, and variations together with all equivalents thereof.

The invention claimed is:

1. A system for managing calls in a telecommunication network, the system comprising:
   a call management device including at least one first processor operable to:
      receive a signaling message, the signaling message including a plurality of signaling parameters, wherein at least one of the signaling parameters is unique to an incoming call;
      determine a unique customer handling parameter from the at least one signaling parameter included in the signaling message, the unique customer handling parameter associated with at least one call handling group predefined at the call management device, the at least one predefined call handling group specifying call handling requirements for the incoming call;
      generate a redirect query, the redirect query including the unique customer handling parameter; and
   a redirect server including at least one second processor operable to receive the redirect query, the redirect server including a plurality of differentiated routing partitions and operable to return to the call management device unique customer call routing information from the plurality of the differentiated routing partitions in response to the redirect query.

2. The system for managing calls in a telecommunication network of claim 1 wherein the call management device is a softswitch.

3. The system for managing calls in a telecommunication network of claim 2, wherein the at least one signaling parameter within the signaling message includes information corresponding to a carrier for handling the incoming call, the information including a carrier identification code (CIC).

4. The system for managing calls in a telecommunication network of claim 3, wherein the unique customer handling parameter is determined by extracting the information about the carrier to be used for handling the incoming call from the signaling message.

5. The system for managing calls in a telecommunication network of claim 2, wherein the unique customer handling parameter is associated with at least one of the plurality of differentiated routing partitions at the redirect server, the at least one of the plurality differentiated routing partitions capable of providing call routing information corresponding to customer defined call handling requirements specified in the at least one predefined call handling group.

6. The system for managing calls in a telecommunication network of claim 2, wherein at least one differentiated routing partition from among the plurality of differentiated routing partitions on the redirect server includes call routing information corresponding to the call handling requirements specified by a customer and is associated with at least one terminating gateway.

7. The system for managing calls in a telecommunication network of claim 2, wherein the unique customer handling parameter is included in a trigger.

8. The system for managing calls in a telecommunication network of claim 2, wherein the redirect query includes a plurality of parameters with at least one of the parameters within the redirect query being replaced with the unique customer handling parameter.

9. The system for managing calls in a telecommunication network of claim 8, wherein the at least one of the parameters within the redirect query includes a carrier identification code (CIC), the carrier identification code being temporarily set aside from the query and replaced with the unique customer handling parameter.

10. The system for managing calls in a telecommunication network of claim 9, wherein the unique customer handling parameter is removed from the redirect query and the carrier identification code is included back in an egress messaging after the redirect query is executed on the redirect server.

11. The system for managing calls in a telecommunication network of claim 9, wherein the unique customer handling parameter is alphanumeric and is more than four characters long.

12. The system for managing calls in a telecommunication network of claim 2, wherein the unique customer call routing information includes terminating gateway information and multiple destination trunk group information.

13. The system for managing calls in a telecommunication network of claim 2, wherein the unique customer call routing information includes a plurality of call termination points information.

14. The system for managing calls in a telecommunication network of claim 2, wherein the unique customer call routing information includes at least one of the terminating gateway information, multiple destination trunk group information or plurality of internet protocol (IP) addresses.

15. The system for managing calls in a telecommunication network of claim 13, wherein the call management device is further operable to select a call termination point from the plurality of call termination points obtained from the redirect server and connect the incoming call to the call termination point selected from the plurality of call termination points.

16. The system for managing calls in a telecommunication network of claim 2, wherein the signaling message is received on a shared access resource, including a Feature Group D trunk.

17. The system for managing calls in a telecommunication network of claim 2, wherein the call management device includes at least a customer identifying element and a call handling element, the at least customer identifying element operable to identify a customer associated with the incoming call and the call handling element operable to provide call handling information based on the call handling requirements specified by the identified customer.

18. A method for managing calls in a telecommunication network, the method comprising:
  at least one computing device in communication with at least one tangible storage media, the tangible storage media including computer executable instructions arranged to perform a method of:
  receiving a signaling message at a call management device, the signaling message including a plurality of signaling parameters, wherein at least one of the signaling parameters includes a call handling information unique to a customer;
  screening the incoming signaling message to determine a unique customer handling parameter based on the at least one of the signaling parameters, the unique customer handling parameter associated with at least one call handling group predefined at the call management device, the at least one predefined call handling group specifying a call handling requirements for the incoming call;
  querying based on the unique customer handling parameter at least one differentiated routing partition on a redirect server associated with the unique customer handling parameter; and
  receiving a unique customer call routing information at the call management device from the differentiated routing partitions in response to the query based on the unique customer handling parameter.

19. The method for managing calls in a telecommunication network of claim 18 wherein the call management device is a softswitch.

20. A method for managing calls in a telecommunication network of claim 19 wherein the signaling message is received on a shared access resource.

* * * * *